United States Patent

Becker et al.

[15] 3,668,318

[45] June 6, 1972

[54] TIME DIVISION HYBRID ARRANGEMENT

[72] Inventors: Floyd Kenneth Becker; James Owen Dimmick; Theras Gordon Lewis; John Francis O'Neill, all of Boulder, Colo.

[73] Assignee: Bell Telephone Laboratories, Inc., Murray Hill, N.J.

[22] Filed: Dec. 14, 1970

[21] Appl. No.: 97,887

[52] U.S. Cl. ....... 179/15 AA

[51] Int. Cl. ....... H04j 3/02

[58] Field of Search ....... 179/15 AA, 15 AL, 18 J; 178/50

[56] References Cited

UNITED STATES PATENTS

| | | | |
|---|---|---|---|
| 3,461,243 | 8/1969 | Höschler | 179/15 AA |
| 3,573,381 | 4/1971 | Marcus | 179/15 R |

*Primary Examiner*—Donald J. Yusko

*Attorney*—R. J. Guenther and James Warren Falk

[57] ABSTRACT

In a time division hybrid arrangement first and second storage devices of one group of storage devices connectable to a common bus are connected to an outgoing line and an incoming line respectively. A third storage device of a group of storage devices connectable to a second common bus is coupled to a bidirectional line. During a first time slot, the first and third storage devices are connected to their common buses; the signal difference between the first and the third storage devices is detected; and distinct signals are applied to the first and third storage devices for a time interval corresponding to the detected difference. In the immediately successive time slot, the second and third storage devices are connected to their common buses; the signal difference between the second and third storage devices is detected; and distinct signals are applied to the second and third storage devices for a time interval corresponding to the detected difference in the immediately successive time slot.

9 Claims, 8 Drawing Figures

INVENTORS F. K. BECKER
J.O. DIMMICK
T.G. LEWIS
J.F. O'NEILL
BY J S Cubert
ATTORNEY

TIME DIVISION HYBRID ARRANGEMENT

BACKGROUND OF THE INVENTION

Our invention is related to signal transfer systems, particularly to signal transfer arrangements between 2-wire and 4-wire lines in time division switching systems employing asynchronous active energy transfer.

Time division switching systems permit simultaneous exchange of information between selectively connected active terminals over a common communication link. Each information exchange between a pair of terminals occurs in a selected recurring interval or time slot of a repetitive group of time slots. During each scan of the time slot group, pairs of active terminals are connected in sequence to the common link in preassigned sequential time slots. In one time slot, a channel is provided between a pair of selected terminal; the information at each terminal assigned to the connection is sampled; and the sampled information is exchanged between the selected terminals over the common link. The common link is available to other connections during the remaining time slots of the scan. As is well known in the art, the sampling rate may be selected to provide an accurate transfer of signals between selectively connected terminals.

In most priorly known time division switching systems, the time slots are of fixed duration regardless of the quantity of energy exchanged between connected terminals. The time slot duration is selected to allow the transfer of the maximum expected energy. Where speech and other types of audio signals are transferred between active terminals, it is known that the amount of energy transferred in a time slot is variable and that the maximum energy transfer is required only during a very small number of time slots. In a speech connection, for example, a terminal pair may be silent for a considerable portion of the conversation time. Thus, the average amount of speech energy exchanged during the fixed time slot period is significantly smaller than the maximum energy. Consequently, a time division switching arrangement utilizing constant duration time slots is not used in an efficient manner.

The communication link between active terminals comprises a plurality of high speed switches, each of which has a finite resistance that contributes to the attenuation of the energy being transferred. In resonant energy transfer multiplex arrangements, the switch resistance may result in appreciable signal losses. Some priorly known time division switching systems include an amplifier arrangement which operates to provide additional energy during the information transfer to offset switch losses. The amplifier arrangement, however, usually results in greater equipment complexity and the addition of further controls.

The aforementioned difficulties have been overcome in a time division switching system wherein the duration of each time slot is not fixed but corresponds to the actual energy exchanged therein and wherein constant current energy exchange is coupled to minimize switching losses. Such a time division switching system is disclosed for example, in the copending patent application of Dimmick Lewis-O'Neill, Application Ser. No. 27892, assigned to the same assignee. In this type of time division switching arrangement, there are first and second groups of storage devices, each first and second group storage device is selectively connectable to a respective one of first and second common buses. During each time slot, the signal from a selected first group storage device and the signal from a selected second group storage device are sampled and transferred to the common buses. The sampled signals on the buses are applied to a timing circuit which produces a pulse having a duration corresponding to the difference between the sampled signals. In response to the timing circuit pulse, one of first and second polarity constant current signals is applied to the selected first group storage device and the other of said first and second polarity constant current signals is applied to the selected second group storage device for the duration of said timing circuit pulse. In this way, the time division switching arrangement operates to exchange signals between a pair of bidirectional lines coupled to selected first and second group storage devices. It is often required, however, to exchange signals between the incoming and outgoing pairs of a 4-wire line and the bidirectional path of a 2-wire line, but the aforementioned variable duration time slot arrangements do not provide such a 2-wire/4-wire hybriding function.

BRIEF SUMMARY OF THE INVENTION

Our invention is a hybrid arrangement in a time division switching system wherein a first group of storage devices is selectively connectable to a first common bus and a second group of storage devices is selectively connectable to a second common bus during a repetitive group of time slots. One first group storage device is coupled to an outgoing line; an incoming line is coupled to another first group storage device; and a second group storage device is coupled to a bidirectional line. During a distinct time slot, the outgoing line storage device and the bidirectional line storage device are connected via said first and second buses to a circuit that operates to detect the difference between signals on a selected pair of first and second group storage devices. In response to the detected difference during said distinct time slot, one of first and second type signals is applied to the outgoing line storage device and the other of said first and second type signals is applied to the bidirectional line storage device for a time interval corresponding to the detected difference.

In the immediately successive time slot, the incoming line storage device and the bidirectional line storage device are connected to the difference detector via said first and second buses. In response to the detected difference in the immediately successive time slot, one of said first and second type signals is applied to the incoming line storage device and the other of said first and second type signals is applied to the bidirectional line storage device. In this manner, a signal from the bidirectional line is transferred to the outgoing line and a signal from the incoming line is transferred to the bidirectional line.

According to one aspect of the invention, there is a direct signal transfer from the bidirectional line storage device to the outgoing line storage device in one time slot of a repetitive cycle and a direct signal transfer from the incoming line storage device to the bidirectional line storage device in a succeeding time slot. The direct signal transfers advantageously require only two succeeding time slots to complete the hybrid signal transfer and eliminate the requirement for an intermediate store interposed between the 4-wire and 2-wire storage devices.

According to another aspect of the invention, the outgoing line storage device is completely discharged in the interval between the hybriding time slots of succeeding repetitive time slot cycles. In this way, the signal transfer between the outgoing line storage device and the bidirectional line storage device results in a unidirectional signal transfer from the bidirectional storage device to the outgoing line storage device in each repetitive cycle, whereby the requirement for an additional time slot during which the outgoing line storage capacitor must be discharged is eliminated.

DETAILED DESCRIPTION

Figure 1:
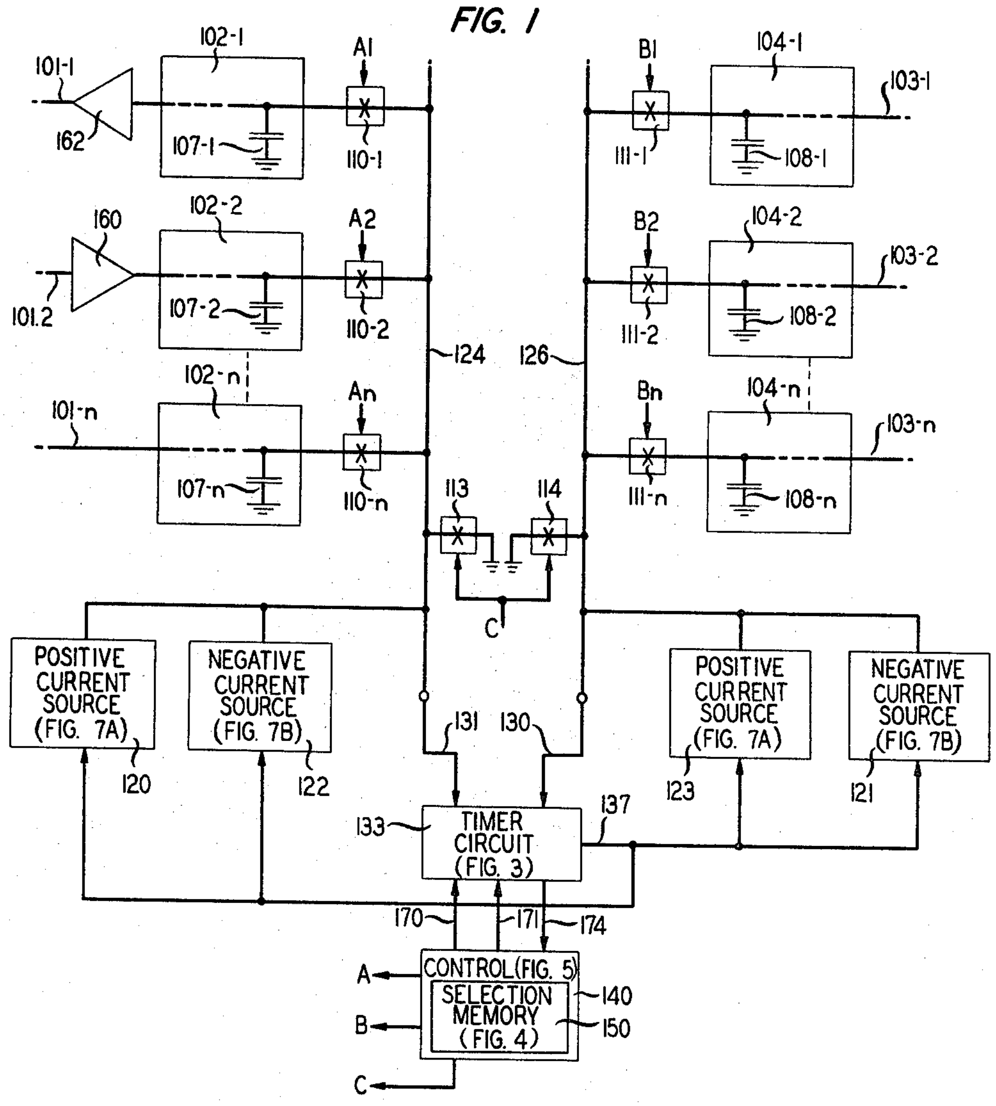
FIG. 1 depicts one illustrative embodiment of the invention in an arrangement wherein a single group of storage devices is coupled to each of the common buses.

Referring to FIG. 1, lines 101-1 through **101-*n* are coupled to common bus 124 via filter circuits 102-1 through 102-*n* and sampling gates 110-1 through 110-*n*, respectively. Lines 103-1 through 103-*n* are coupled to common bus 126 via filters 104-1 through 104-*n* and sampling gates 111-1 through 111-*n*, respectively. The operation of the sampling gates are controlled by control 140 so that a selected line associated with bus 124 and a selected line associated with bus 126 are connected to their respective common buses in a distinct time slot. The active lines are connected in accordance with the operation of selection memory 150 in successive time slots of each memory scan. The scans occur in repetitive cycles so that information is simultaneously exchanged between pairs of selectively interconnected lines. Control 140 changes the selection of memory 150 therein at the end of each time slot and provides control signals to timer 133**.

Lines 101-1 through **101-*n* in accordance with our invention may include one or more pairs of 4-wire lines. In FIG. 1, line 101-1 is an outgoing line and line 101-2 is an incoming line of a 4-wire arrangement. Amplifier 160 couples signals from incoming line 101-2 to filter 102-2 and amplifier 162 couples signals from filter 102-1 to outgoing line 101-1. Lines 103-1 through 103-n are all bidirectional lines; and, in accordance with our invention, a pair of unidirectional lines such as 101-1 and 101-2 may be selectively connected to any of bidirectional lines 103-1 through 103-*n*** to provide a hybrid for 2-wire to 4-wire conversion in two successive time slots.

Figure 6:
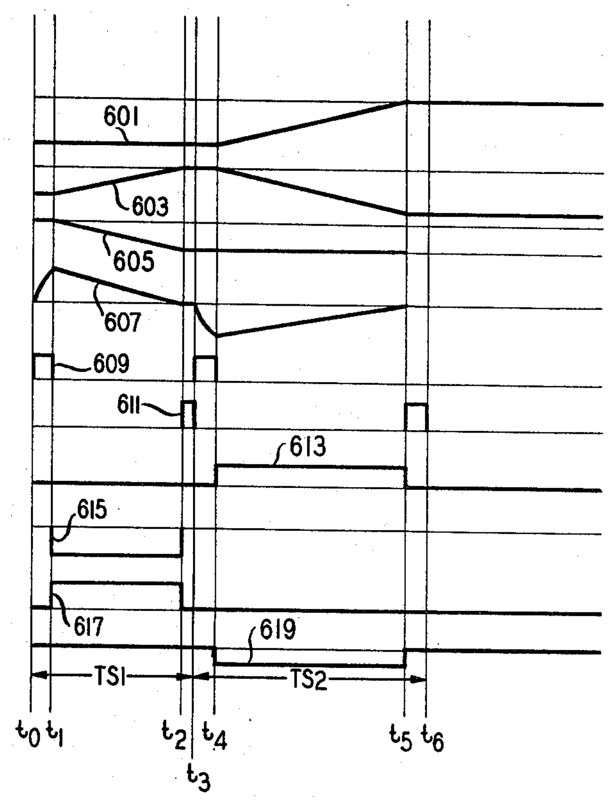
FIG. 6 shows waveforms illustrating the operation of embodiments depicted in FIGS. 1 and 2.

Assume for purposes of description that information is exchanged between incoming line 101-2, outgoing line 101-1, and bidirectional line 103-1. It is to be understood that information can be exchanged between any pair of incoming and outgoing lines associated with one bus and any bidirectional line associated with the other common bus. The information from bidirectional line 103-1 associated with one common bus is applied to filter 104-1 and is stored on capacitor 108-1. In like manner, the information from incoming line 101-2 is stored on capacitor 107-2. At the beginning of time slot $ts_1$, shown on FIG. 6, it is assumed that capacitor 107-1 associated with outgoing line 101-1, is uncharged because the signal stored thereon has previously been applied to amplifier 162. This is shown at time $t_0$ on waveform 605 which waveform represents the signal voltage on capacitor 107-1. The signal voltage on capacitor 107-2 at time $t_0$ is shown in waveform 601 and the signal voltage on capacitor 108-1 is shown on waveform 603.

At $t_0$, in time slot $ts_1$, gates 110-1 and 111-1 are opened under control of control 140. Control signal A, from control 140 opens gate 110-1 and control signal B opens gate 111-1. With these gates opened, the voltage on selected capacitor 108-1 is transmitted to bus 126 and the voltage on selected capacitor 107-1 is transmitted to bus 124. Bus 124 is connected to timer circuit 133 via lead 131 and bus 126 is connected to timer circuit 133 via lead 130. In time slot $ts_1$, the signal voltages on capacitors 107-1 and 108-1 are exchanged. Since capacitor 107-1 contains a zero signal voltage, the net effect is to transmit a sample of the signal stored on capacitor 108-1 to capacitor 107-1 associated with outgoing line 101-1. In this way, a sample of the signal from bidirectional line 103-1 is transferred to outgoing line 101-1 in each $ts_1$ time slot.

Figure 3:
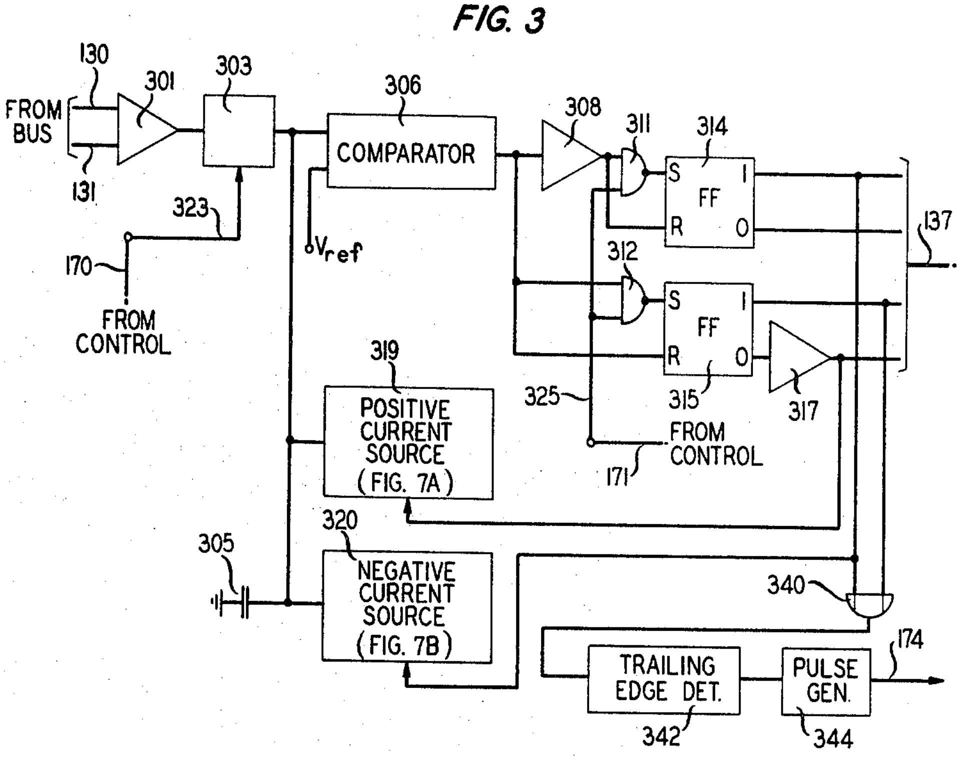
FIG. 3 depicts a timer circuit useful in the embodiments of FIGS. 1 and 2.

Timer circuit 133 is shown in FIG. 3 and comprises differential amplifier 301, sampling gate 303, storage capacitor 305, comparator 306, flip-flops 314 and 315 and current sources 319 and 320. The inputs of differential amplifier 301 are connected to bus 124 via lead 131 and to bus 126 via lead 130. At time $t_0$ of time slot $ts_1$, a sampling signal is sent from control 140 via leads 170 and 323 to sampling gate 303. This sampling signal is illustrated in waveform 609. Between times $t_0$ and $t_1$, the sampled output of amplifier 301 is applied to storage capacitor 305 as shown in Waveform 607 which waveform illustrates the signal voltage on capacitor 305. The output from differential amplifier 301 corresponds to the voltage difference between buses 124 and 126.

At time $t_1$, the voltage difference is stored on capacitor 305, and the stored voltage difference is applied to comparator 306 wherein it is compared to a reference voltage which may be a ground voltage level. As illustrated in waveform 607, this voltage difference is positive, signifying that the voltage on bus 124 is more positive than the voltage on bus 126. In this event, the output of comparator 306 is a low logic level. This low logic level is inverted in inverter 308 and the high logic level output of inverter 308 is applied to NAND gate 311. The low logic level from comparator 306 is applied directly to NAND gate 312. At $t_1$, a high logic level is also applied to gates 311 and 312 from control 140 via leads 171 and 325. Since the output of comparator 306 is a low logic level, both inputs to gate 311 are high; gate 311 is opened; and a low logic level output from this gate sets flip-flop 314. Gate 312 is not opened at time $t_1$ because the low logic level output of comparator 306 operates to inhibit gate 312.

The one output of flip-flop 314 becomes high at time $t_1$ and this high level signal is transmitted from flip-flop 314 to negative current source 122 on FIG. 1 via cable 137. The low level zero output of flip-flop 314 is applied to positive current source 123 via cable 137. Current sources 122 and 123, shown in FIG. 1, are high impedance constant current sources which produce equal magnitude but opposite polarity constant currents. Current source 123 applies charge to capacitor 108-1 and current source 122 removes charge from capacitor 107-1. The constant current output of current source 122 during time slot $ts_1$ is shown in waveform 615 and the constant current output of current source 123 is shown in waveform 617. The one output of flip-flop 314 is also applied to negative current source 320 on FIG. 3. Negative current source 320 removes charge from capacitor 305 at a constant rate as illustrated in waveform 607.

When, at $t_2$, the voltage on capacitor 305 is equal to the reference voltage $V_{ref}$, comparator 306 switches and its output changes to the high logic level. In response to the low logic level applied to the reset input of flip-flop 315 from comparator 306, via inverter 308, flip-flop 314 is reset and current sources 122, 123 and 320 are disabled. Where the sampled voltage signal on bus 126 is more positive than the sampled voltage signal on bus 124, the operation of timing circuit is substantially similar except flip-flop 315 is set and current sources 120, 121 and 319 are enabled.

At time $t_2$, sampling gates 110-1 and 111-1 are closed so that capacitors 107-1 and 108-1 are isolated from the common bus. In this way, the duration of time slot $ts_1$ is determined by the sampled voltage difference between buses 124 and 126.

At time $t_2$, the voltage on capacitor 107-1 associated with outgoing line 101-1 is negative and equal to the voltage previously on capacitor 108-1 at time $t_1$. The zero voltage on capacitor 107-1 at time $t_1$, illustrated in waveform 605, is transferred to capacitor 108-1 by time $t_2$ as illustrated in waveform 603. Thus, the signal voltage on capacitor 108-1 from the bidirectional line 103-1 is transferred to capacitor 107-1 and therefrom to outgoing line 101-1 via amplifier 162.

Between times $t_2$ and $t_3$ of time slot $ts_1$, a bus quenching signal on lead C, illustrated in waveform 611, is applied from control 140 to gates 113 and 114. The bus quenching signal opens gates 113 and 114 so that any residual voltages remaining on common buses 124 and 126 at $t_2$ are removed.

At time $t_2$, the change of state of flip-flop 314 causes a pulse to be applied to trailing edge detector 342 via OR Gate 340. As is well known in the art, trailing edge detector 342 produces a pulse in response to the signal from OR Gate 340. Detector 342, in turn, enables pulse generator 344. Pulse generator 344 then applies a short duration pulse to control 140 via lead 174. This pulse on lead 174 is transmitted to control 140 which in turn causes the time slot $ts_1$ to be terminated so that the signal on lead 171 is removed. The pulse on lead 174 also causes selection memory 150 to be altered to provide the addressing of the immediately successive time slot.

Figure 4:
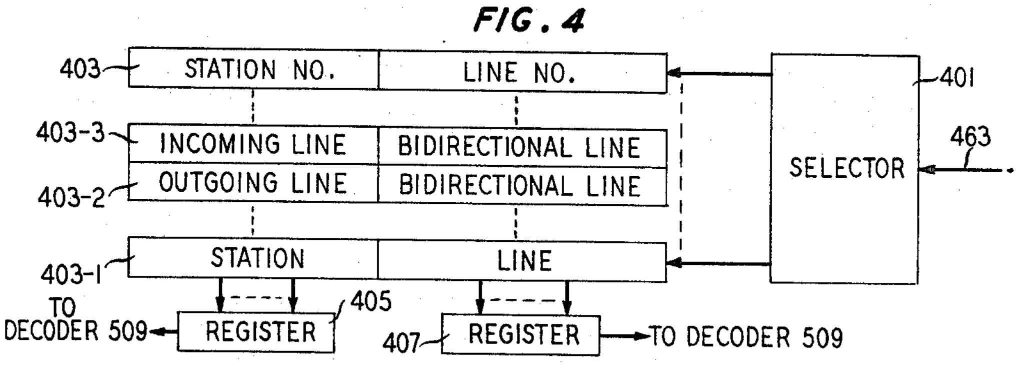
FIG. 4 illustrates a selection memory circuit that may be used in the embodiments of FIGS. 1 and 2.

Referring to FIG. 4, which shows selection memory 150, memory cell 403-2 is selected by selector 401 in time slot $ts_1$ so that lines 101-1 and 103-1 are selected. This addressing information from cell 403-2 is coupled via registers 405 and 407 and a decoder in control 140 to cables A and B so that a signal on $A_1$ opens gate 110-1 and a signal on $B_1$ opens gate 111-1 during time slot $ts_1$. At the beginning of time slot $ts_2$ selector 401 operates to transfer the contents of memory cell 403-3 to registers 405 and 407. In response to the contents of cell 403-3, signals from control 140 are applied via the A and B cables to gates 110-2 and 111-1 so that the incoming line storage capacitor 107-2 is connected to common bus 124 and bidirectional line storage capacitor 108-1 is connected to common bus 126.

At time $t_3$, storage capacitor 107-2 contains a negative signal voltage from amplifier 160 as shown in waveform 601; and bidirectional storage capacitor 108-1 contains a zero signal voltage as indicated on waveform 603. The signals from capacitors 107-2 and 108-1 are applied to timer circuit 133 via buses 126 and 124 and leads 130 and 131. These signals are then applied to differential amplifier 301, as shown in FIG. 3, between times $t_3$ and $t_4$. A sampling pulse applied to gate 303 via leads 170 and 323 between times $t_3$ and $t_4$ causes the received signal difference from differential amplifier 301 to be stored in capacitor 305, and the negative difference signal appears on capacitor 305 at time $t_4$. The voltage difference stored on capacitor 305 is applied to comparator 306. Since this voltage difference is negative, as illustrated in waveform 607, the output of comparator 306 is a high logic level. This high logic level causes a low logic level input to be applied to gate 311 and a high logic level input to be applied to gate 312. The control signal applied from control 140 via leads 171 and 325 becomes high at time $t_4$ so that gate 312 is opened and the low logic level signal from gate 312 sets flip-flop 315. Flip-flop 314 remains reset because the low logic level output of inverter 308 inhibits gate 311 at this time.

The one output of flip-flop 315 is high at time $t_4$ whereby negative current source 121 is enabled via cable 137 and positive current source 120 is also enabled via cable 137. The current source signals from sources 120 and 121 are indicated on waveforms 613 and 619, respectively. Current source 121 produces a negative constant current signal which removes charge from capacitor 108-1 and current source 120 produces a positive constant output signal which charges capacitor 107-2. The zero output of flip-flop 315 is also applied to a positive current source 319, which in turn adds charge from capacitor 305 at a constant rate as indicated on waveform 607 between times $t_4$ and $t_5$. At $t_5$, comparator 306 is switched to the low level state which is applied to the reset input of flip-flop 315. Flip-flop 315 is then reset and current sources 120, 121 and 319 are disabled. At time $t_5$, the constant current signal transfers to capacitors 107-2 and 108-1 are completed. Capacitor 108-1 now contains the incoming signal voltage that was present on capacitor 107-2 at time $t_4$ and capacitor 107-2 now contains the zero signal voltage that was present on capacitor 108-1 at $t_4$.

A bus quenching signal is applied from control 140 to gates 113 and 114 via cable C between $t_5$ and $t_6$; and gates 113 and 114 remove any residual voltage remaining on buses 124 and 126. At time $t_6$, the end of time slot $ts_2$, the hybrid transfer of signals between incoming and outgoing lines 101-2 and 101-1, and bidirectional line 103-1 is complete. During the time slot $ts_1$, the signal from bidirectional line 103-1 is transferred to the outgoing line 101-1; and during time slot $ts_2$, the signal from incoming line 101-2 is transferred to bidirectional line 103-1. At time $t_6$, outgoing storage capacitor 107-1 contains a negative signal but this negative signal is dissipated in the input circuit of amplifier 162 before the next occurrence of time slot $ts_1$ whereby the hybrid operation may be repeated in each time slot cycle. In this way, the hybrid transfer of signals is accomplished on a time division basis.

Figure 7A:
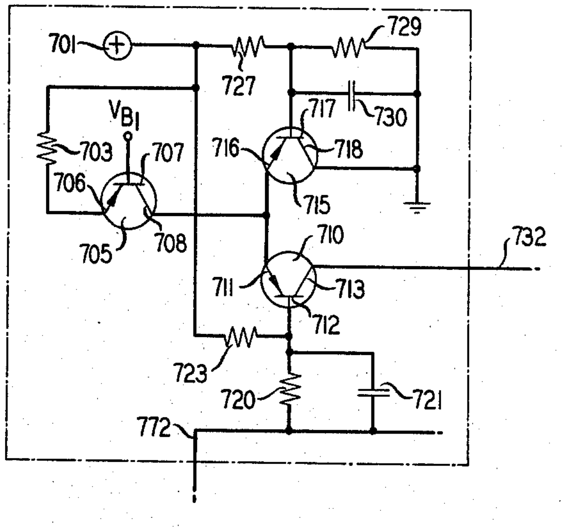
FIGS. 7A and 7B illustrate constant current sources that may be employed in the embodiments of FIGS. 1 and 2.

The circuit shown in FIG. 7A may be incorporated in positive current source 120 or positive current source 123 of FIG. 1 to provide the positive constant current required for energy transfer between the selectively connected capacitors. It is to be understood that other constant current circuit arrangements known in the art may also be used. Referring to FIG. 7A, emitter 706 of transistor 705 receives a predetermined current from the source including voltage source 701 and resistor 703. Base 707 is biased at voltage $V_{B1}$ so that transistor 705 is conducting with its collector-base diode reverse biased. In this mode of operation, transistor 705 provides a constant current which normally flows into emitter 716 of transistor 715 since transistor 716 is normally turned on by means of the divider network connected to base 717. This divider network comprises resistors 727 and 729 which resistors are arranged so that the emitter-base diode of transistor 715 is forward-biased. Capacitor 730 provides a bypass path to filter noise appearing on base 717.

Lead 772 is connected to cable 137 so that a negative going waveform may be applied to base 712 of transistor 710 from timer circuit 133 via the coupling network including resistor 720, capacitor 721, and resistor 723. This network is arranged to normally reverse-bias base 712 in the absence of a negative going signal on lead 772. When a negative going signal is applied to lead 772 in response to the operation of timer circuit 133, transistor 710 is conducting and the constant current from collector 708 is applied to lead 732 via the emitter-collector path of transistor 710. When transistor 710 conducts, emitter 716 of transistor 715 is reverse-biased and the current from transistor 705 is then applied to lead 732. This arrangement permits a positive constant current from a high impedance source to be applied to the selected one of buses 124 or 126.

Figure 7B:
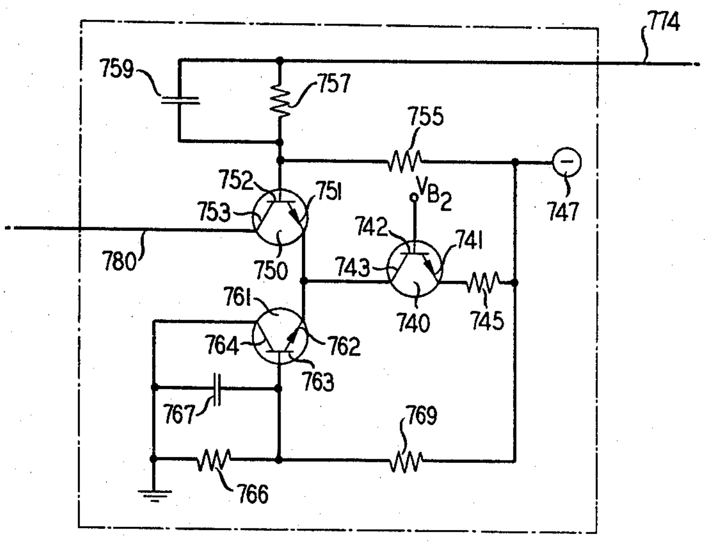

A negative constant current source is shown in FIG. 7B. The arrangement therein comprises transistors 761, 750 and 740. Negative voltage source 747 and resistor 745 provides a negative current for emitter 741 of transistor 740. The bias voltage $V_{B2}$ on base 742 causes transistor 740 to conduct so that the collector-base diode thereof is reverse-biased. This provides a constant current to normally conducting transistor 761. The base network arrangement including negative source 747, resistors 769 and 766, and capacitor 767 forward-biases the base emitter diode of transistor 761 so that this transistor is saturated. This leaves transistor 750 in a nonconducting state. When a positive going pulse is applied to lead 774 from timer circuit 133 via cable 137, base 752 is made positive through the network including resistors 757, 755 and capacitor 759. The base-emitter diode of transistor 750 then conducts and the current from collector 743 is applied through the emitter-collector path of transistor 750 to lead 780. With transistor 750 conducting, transistor 761 is cut off. In this way a high impedance negative current source is provided. Lead 732 from the current source may be connected to appropriate common buses to supply the signals in response to the output of timer circuit 133.

Figure 2:
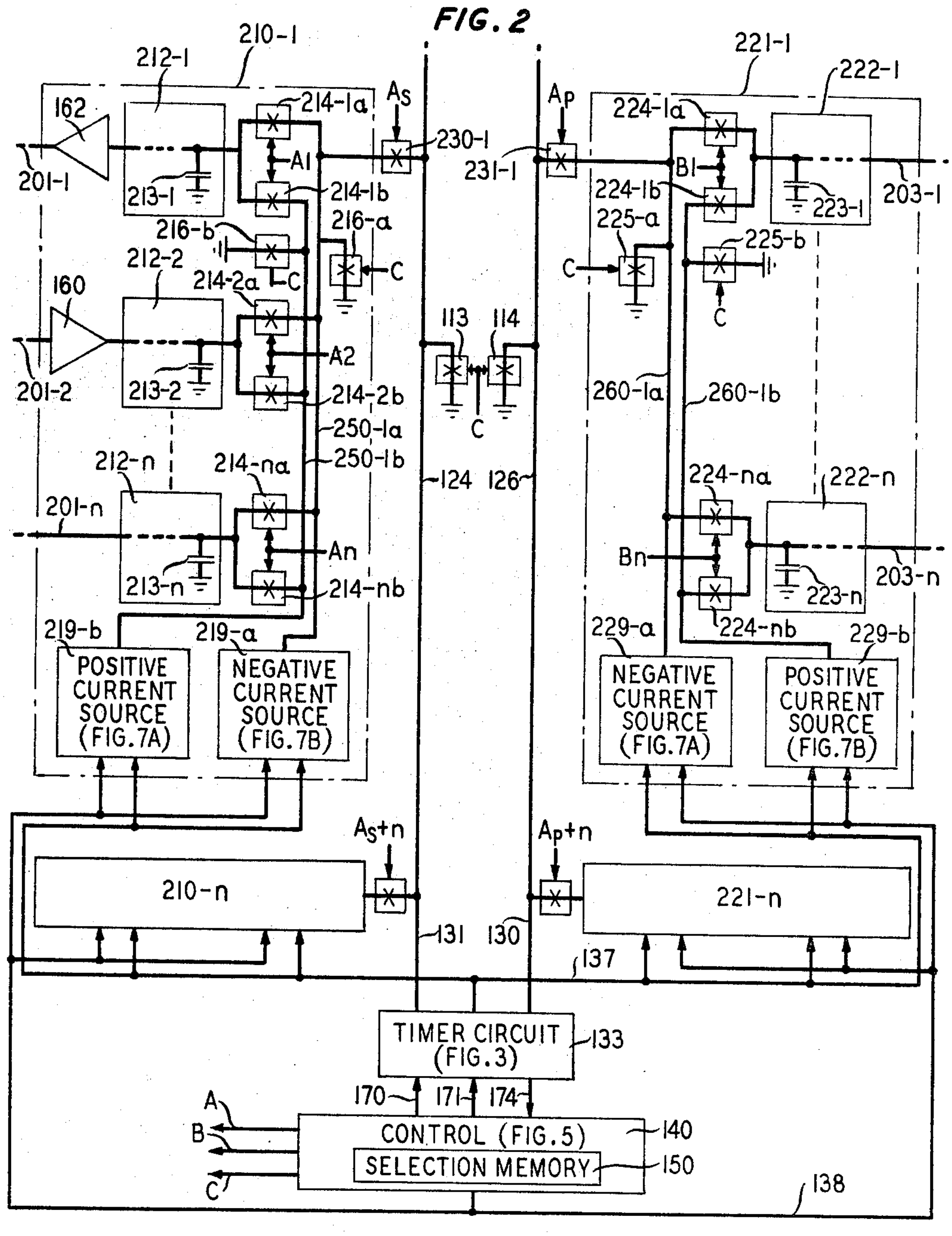
FIG. 2 depicts another illustrative embodiment of the invention in an arrangement in which a plurality of local groups of storage devices are connected to each common bus.

FIG. 2 shows the hybrid arrangement of the invention in another embodiment wherein the lines associated with each common bus are divided into groups. Each group comprises a pair of local buses, one of which is connected to an associated common bus through a sampling gate. Each group further comprises separate positive and negative current sources. This current source arrangement advantageously does not limit the size of the common bus.

In FIG. 2, there is shown a pair of common buses 124 and 126. Common bus 124 is connectable to line groups 210-1 through 210-*n* and common bus 126 is connectable to line groups 221-1 through 221-*n*. Group 210-1 is representative of the line groups associated with bus 124. Group 210-1 comprises filters 212-1 to 212-*n*; each filter is connected to a pair of local buses via a pair of sampling gates. Some of the lines 201-1 through 201-*n* may be incoming and outgoing lines of a 4-wire arrangement. In FIG. 2, it is assumed that line 201-2 is an incoming line and line 201-1 is an outgoing line. Amplifier 160 couples incoming signals from line 201-2 to filter 212-2 and amplifier 162 couples outgoing signals from filter 212-1 to outgoing line 201-1. The other groups associated with common bus 124 may also contain 4-wire lines as illustrated in group 210-1. Each filter in group 210-1 is connectable to local bus 250-1*a* via sampling gates 214-1*a* through 214-*na* and each of these filters is connectable to bus 250-*b* via sampling gates 214-1*b* to 214-*nb*. Bus 250-1*a* is further connected to negative current source 219-*a* and bus 250-1*b* is connected to positive current source 219-*b*. Quenching gates 216-*a* and 216-*b* are connected to local buses 250-1*a* and 250-1*b* respectively so that the local buses may be discharged at the end of each time slot during which these buses are used. Local bus 250-1*a* is also connectable to common bus 124 via sampling gate 230-1.

Group 221-1 is substantially similar to that described with respect to 210-1 except that each filter in this group is connected to a bidirectional line. The local bus sampling gate and current source arrangements are substantially similar to that described with respect to group 210-1. Local buses 260-1*a* and 260-1*b* are used in group 221-1 and quenching gates 225*a* and 225*b* serve to remove residual voltage from these local buses at the end of each time slot.

The operation of the hybrid arrangement illustrated in FIG. 2 is substantially similar to that described with respect to FIG. 1 except that gating arrangements are adapted to the multiple local bus arrangement. Thus, during the slot $ts_1$, illustrated in FIG. 6, sampling gates 214-1*a*, 214-1*b* and 230-1 are simultaneously operated under control of control 140 in accordance with the memory selection arrangement of selected memory cell 403-2 shown in FIG. 4. Sampling gates 224-1*a*, 224-1*b* and 231-1 are also simultaneously operated during time slot $t_1$ so that capacitor 223-1, associated with bidirectional line 203-1, is connected to bus 126.

As described with respect to FIG. 1, during time slot $ts_1$, the voltages of capacitors 213-2 and 223-1 are sampled and applied via common bus 124 and 126 to timer circuit 133. In response to the sampled voltage difference between capacitors 213-1 and 223-1, timer circuit 133 produces a pulse having a duration corresponding to the sampled voltage difference and the timer circuit output pulse is selectively applied to current sources 219-*a* and 229-b under control of control 140 via cable 138. At time $t_2$ of time slot $ts_1$, the signal on capacitor 223-1 at time $t_1$ from bidirectional line 203-1 appears on capacitor 213-1 associated with outgoing line 201-1 and the zero signal on capacitor 213-1 at time $t_1$ appears on capacitor 223-1.

At the beginning of time slot $ts_2$, the addresses stored in memory cell 403-3 of memory 150 causes control 140 to enable sampling gates 214-2*a*, 214-2*b*, 230-1, 224-1*a*, 224-1*b* and 231-1 simultaneously so that the signal voltages present on capacitors 213-2 and 223-1 are applied to timer circuit 133 via common buses 124 and 126 and leads 131 and 130. Timer circuit 133 then produces a pulse having a duration corresponding to the sampled voltage difference between capacitors 213 and 223-1. This timing circuit pulse during time slot $ts_2$ enables negative current source 229-*a* and positive current source 219-*b*. These current sources are selected in accordance with signals from control 140 applied via cable 138 to the current sources. At the end of time slot $ts_2$, the signal voltage from incoming line 201-2 that was present on 213-2 at the beginning of time slot $ts_1$ is contained in capacitor 223-1 and coupled therefrom to bidirectional line 203-1. In this way, the hybrid operation is accomplished and the signal from bidirectional line 203-1 is transferred to outgoing line 201-1 in time slot $ts_1$ while the incoming signal from line 201-2 is transferred to bidirectional line 203-1 on a time division basis.

In the embodiments of FIGS. 1 and 2, the constant current sources associated with the buses linearly charge the selected storage capacitors in accordance with the initially sampled voltage difference. The charging is terminated when the voltage on capacitor 305 of the timing circuit equals the reference voltage applied to comparator 306. Capacitor 305 is also charged from a constant current source. It is readily seen that the sampled voltage difference is transferred to said selected storage capacitor when the charging is terminated during a time slot whereby the signal voltages on the selected storage capacitors are exchanged.

Figure 5:
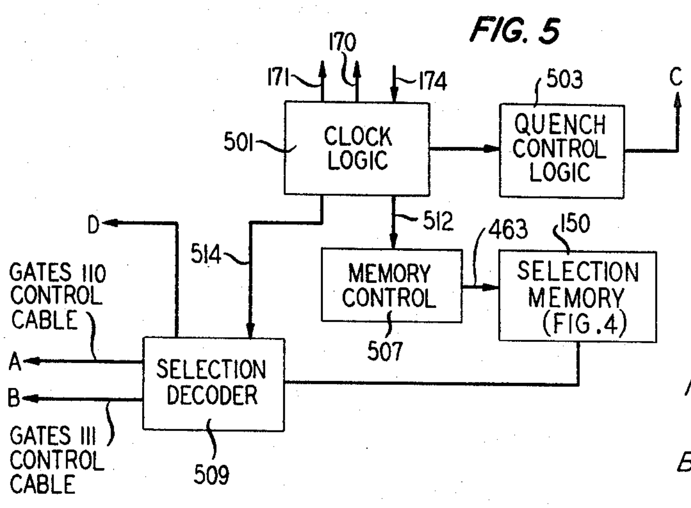
FIG. 5 illustrates a control circuit useful in the embodiments of FIGS. 1 and 2.

Control 140 of FIGS. 1 and 2 may comprise the circuit shown on FIG. 5. Referring to FIG. 5, a signal is applied to clock logic 501 from timer circuit 133 via lead 174 at the signal transfer period of each time slot including the time slots illustrated in FIG. 6. Clock logic 501 includes well known logic circuits and operates in response to the signal on lead 174 to provide a pulse to quench control logic 503. Logic 503 in turn generates a group of signals which signals are applied to gates 113 and 114 via cable C to quench buses 124 and 126. In FIG. 2, the quenching signals are also applied to the quenching gates of the selected group buses, e.g., gates 216*a*, 216*b*, 225*a* and 225*b*. A signal is applied from clock logic 501 to memory control 507 via lead 512. This signal is used to alter the memory cell selection in selection memory 150 by changing the state of selector 401 via lead 463. In response to the signal from memory control 507, selection memory 150 applies line addresses to selection decoder 509. The decoder in turn applies an $A_1$ signal via cable A to one of sampling gates 110-1 to 110-*n* of FIG. 1 and a $B_1$ signal via cable B to one of sampling gates 111-1 to 111-*n* of FIG. 1. These signals from cables A and B operate in a similar fashion with respect to FIG. 2. A signal is also applied via cable D in the embodiment illustrated in FIG. 2 so that a particular set of local current sources are enabled.

Selection decoder 509 is alerted by the signal on lead 514 by clock logic 501. Clock logic 501 also produces a pulse which is applied to timer circuit 133 via lead 170 to open gate 303 so that the sampled signal difference in the next time slot may be stored on capacitor 305 and further applies a signal via lead 171 to alert gates 311 and 312 during the signal transfer period of each time slot.

What is claimed is:

1. A hybrid circuit for coupling an incoming path and an outgoing path to a bidirectional path in a time division switching system having a first group of storage devices selectively connectable to a first bus, a second group of storage devices selectively connectable to a second bus, means connected to said first and second buses for detecting the difference between the outputs of a selected first group storage device and a selected second group storage device in each of a plurality of time slots, and means responsive to said detected difference for applying one of first and second type signals to said selected first group storage device and the other of said first and second type signals to said selected group storage device for a time interval corresponding to said detected difference, said hybrid circuit comprising one first group storage device coupled to said outgoing line, another first group storage device coupled to said incoming line, one second group storage device coupled to said bidirectional line, first means for selectively connecting said outgoing line coupled storage device to said first bus and for selectively connecting said bidirectional line coupled storage device to said second bus as said selected first and second group storage devices during a distinct time slot, and second means for selectively connecting said incoming line coupled storage device to said first bus and for selectively connecting said bidirectional line coupled storage device to said second bus as said selected first and second group storage devices in the next successive time slot.

2. A hybrid circuit according to claim 1 wherein said first selectively connecting means comprises first gating means connected between said outgoing line coupled storage device and said first common bus, second gating means connected between said bidirectional line coupled storage device and said second common bus, first means for storing a first code corresponding to said outgoing line coupled storage device and a second code corresponding to said bidirectional line coupled storage device, and means connected between said first storing means and said first and second gating means responsive to said first and second codes for opening said first and second gates during said distinct time slot, said second selectively connecting means comprises said second gating means and third gating means connected between said incoming line coupled storage device and said first common bus, second means for storing a third code corresponding to said incoming line coupled storage device and a fourth code corresponding to said bidirectional line coupled storage device and means connected between said storing means and said second and third gating means responsive to said third and fourth codes for opening said second and third gating means during said next successive time slot.

3. A hybrid circuit according to claim 2 wherein each of said signal applying means comprises first means for producing a constant current signal of one polarity, second means for producing a constant current signal of the opposite polarity, means for connecting said first and second constant current signal producing means to one of said first and second buses, and means responsive to said detected difference for enabling said one of said first and second constant current producing means for a time corresponding to said detected difference in outputs.

4. A hybrid circuit according to claim 1 wherein each of said storage devices comprises a storage capacitor.

5. A hybrid circuit for transferring signals between the incoming path and the outgoing path of a 4-wire line and the bidirectional path of a 2-wire line in a time division switching system having first and second common buses, a plurality of time slots occurring in repetitive cycles and at least first, second and third storage devices, said hybrid circuit comprising said first storage device coupled to said outgoing path, said second storage device coupled to said incoming path, said third storage device coupled to said bidirectional path, means for selectively connecting said first storage device to said first common bus and said third storage device to said second common bus in a distinct time slot in each cycle, means for selectively connecting said second storage device to said first common bus and said third storage device to said second common bus in the next successive time slot of each cycle, means for detecting the difference between signals applied to each common bus from said connected storage device in each of said time slots, means responsive to said detected difference in each of said time slots for generating a first polarity signal and a second polarity signal, means responsive to said detected difference for applying said first polarity signal to one of said first and second common buses for a time corresponding to said detected difference, and for applying said second polarity signals to the other of said first and second common buses for a time corresponding to said detected difference.

6. A hybrid circuit according to claim 5 wherein said means for generating said first and second polarity signals comprises means for generating a positive constant current signal, means for generating a negative constant current signal, said applying means comprises means for applying said positive constant current signal to one of said first and second buses and means for applying said negative constant current signal to the other of said first and second buses in each of said time slots, said positive and negative constant current signals being equal in magnitude.

7. A time division hybrid circuit for coupling an incoming path and an outgoing path to a bidirectional path comprising a storage device coupled to said incoming path, a storage device coupled to said outgoing path and a storage device coupled to said bidirectional path, first means for connecting said outgoing path coupled storage device to a first common bus and said bidirectional path storage device to a second common bus in a distinct time slot of a repetitive group of time slots, means connected to said first and second common bus for detecting the difference between said outgoing path storage device output and said bidirectional path storage device output in a first portion of said distinct time slot, means for generating first and second type signals, means operative in a second portion of said distinct time slot responsive to said detected difference for applying one of said generated first and second type signals to said outgoing path storage device and for applying the other of said first and second type signals to said bidirectional path storage device for a time period corresponding to said detected difference, means for connecting said incoming path storage device to said first common bus and said bidirectional path storage device to said second common bus in the next successive time slot, means for detecting the difference between said incoming path storage device output and said bidirectional path storage device output during a first portion of said next successive time slot, and means operative in a second portion of said next successive time slot responsive to said detected difference for applying one of said generated first and second type signals to said incoming path storage device and for applying the other of said other of said generated first and second type signals to said bidirectional path storage device for a time period corresponding to said detected difference in said next successive time slot.

8. A hybrid arrangement in a time division switching system having first and second groups of storage devices, first and second common buses and a plurality of time slots occurring in repetitive cycles, said hybrid arrangement comprising amplifier means for coupling an outgoing line to one of said first group storage devices, amplifier means for coupling an incoming line to another of first group storage devices, means for coupling a bidirectional line to one second group storage device, first gating means for selectively connecting said outgoing line storage device to said first common bus, second gating means for selectively connecting said incoming line storage device to said first common bus, third gating means for selectively connecting said bidirectional line storage device to said second common bus, means for opening said first and third gating means in a distinct time slot, means connected to said first and second common buses for detecting the voltage difference between said outgoing line storage device and said bidirectional line storage device in the initial portion of said distinct time slot, means for storing said detected difference in said distinct time slot, means responsive to said stored difference for generating a pulse having a duration corresponding to said stored detected difference in said distinct time slot, means responsive to said generated pulse for applying one of first and second polarity currents to said first common bus and for applying the other of said first and second polarity currents to said second common bus for the duration of said pulse, in said distinct time slot, means for opening said second and third gating means in the next successive time slot, means connected to said first and second common buses for detecting the voltage difference between said incoming line storage device and said bidirectional line storage device in the initial portion of said next successive time slot, means for storing said detected difference in said next successive time slot, means responsive to said stored detected difference in said next successive time slot for generating a pulse having a duration corresponding to said next successive time slot stored detected difference, means responsive to said pulse generated in said next successive time slot for applying one of said first and second polarity currents to said first common bus and the other of the said first and second polarity currents to said second common bus for the duration of said generated pulse in said next successive time slot.

9. In a time division switching system having a plurality of time slots occurring in repetitive cycles, a first common bus; a second common bus; a first group of coupling circuits and a second group of coupling circuits; each coupling circuit comprising a first and a second bus, a plurality of storage devices, each circuit storage device being selectively connectable to said circuit first and second buses, means for applying a first polarity constant current signal to said first bus, and means for applying a second polarity constant current signal to said second bus; means for selectively connecting each first group circuit first bus to said first common bus; means for selectively connecting each second group circuit first bus to said second common bus; means connected to said first and second common buses responsive to the difference between a signal from a selectively connected first group storage device and a signal from a selectively connected second group storage device for generating a pulse having a duration corresponding to said signal difference; means responsive to said pulse for enabling the first polarity constant current signal applying means of said selected first group circuit for the duration of said pulse; and means responsive to said pulse for enabling the second polarity constant current signal applying means of said selected second group circuit for the duration of said pulse; a hybrid circuit for coupling an incoming path and an outgoing path to a bidirectional path comprising a first storage device in one of said first group of coupling circuits coupled to said outgoing path, a second storage device in said one first group coupling circuit coupled to said incoming path, a third storage device in one of said second group circuits coupled to said bidirectional path, means operative in a distinct time slot of each repetitive cycle for selectively connecting said outgoing path coupled storage device to said one first group coupling circuit first and second buses and for selectively connecting said bidirectional path to said one second coupling circuit first and second buses, and means operative in the next successive time slot of each repetitive cycle for selectively connecting said incoming path coupled storage device to said one first group coupling circuit first and second buses and for selectively connecting said bidirectional path coupled storage device to said one second group coupling circuit first and second buses.

* * * * *